(12) United States Patent
Kaare, Jr. et al.

(10) Patent No.: US 6,884,020 B2
(45) Date of Patent: Apr. 26, 2005

(54) TURBINE DRIVEN WITH A FLUID MEDIUM

(75) Inventors: Finn Kaare, Jr., Oslo (NO); Even Evensen, Vollen (NO)

(73) Assignee: Water Power Industries AS, Oslo (NO)

( * ) Notice: Subject to any disclaimer, the term of this patent is extended or adjusted under 35 U.S.C. 154(b) by 80 days.

(21) Appl. No.: 10/390,245

(22) Filed: Mar. 17, 2003

(65) Prior Publication Data

US 2003/0231951 A1 Dec. 18, 2003

Related U.S. Application Data

(63) Continuation-in-part of application No. 09/869,888, filed as application No. PCT/NO00/00002 on Jul. 6, 2000, now abandoned.

(30) Foreign Application Priority Data

Jan. 6, 1999 (NO) ................................................. 990039
Sep. 3, 1999 (NO) ................................................. 994310

(51) Int. Cl.[7] ............................................... F03D 7/04
(52) U.S. Cl. ............................ 415/1; 415/4.2; 415/4.4; 415/60; 415/118; 415/907
(58) Field of Search .............................. 415/1, 4.2, 4.4, 415/60, 118, 907; 416/111, 120, 170 R, 155

(56) References Cited

U.S. PATENT DOCUMENTS

| | | | |
|---|---|---|---|
| 1,810,159 A | 6/1931 | Carol | |
| 2,250,772 A | 7/1941 | Mueller et al. | |
| 2,950,765 A | 8/1960 | Magnuson | |
| 4,045,134 A | 10/1977 | Rumsey | |
| 4,168,439 A | 9/1979 | Palma | |
| 4,299,537 A | 11/1981 | Evans | |
| 4,368,392 A * | 1/1983 | Drees | 290/54 |
| 4,430,044 A | 2/1984 | Liljegren | |
| 4,546,264 A | 10/1985 | Pinsom | |
| 5,150,859 A * | 9/1992 | Ransick | 290/55 |
| 6,065,935 A | 5/2000 | Perfahl | |
| 6,091,161 A * | 7/2000 | Dehlsen et al. | 415/7 |
| 6,121,735 A * | 9/2000 | Igeta et al. | 318/101 |
| 6,379,115 B1 * | 4/2002 | Hirai | 416/111 |

FOREIGN PATENT DOCUMENTS

| | | |
|---|---|---|
| DE | 195 44 400 A1 | 6/1997 |
| DK | 164294 | 6/1992 |
| WO | WO 94/29590 | 6/1994 |

* cited by examiner

*Primary Examiner*—Edward K. Look
*Assistant Examiner*—Igor Kershteyn
(74) *Attorney, Agent, or Firm*—Scully, Scott, Murphy & Presser

(57) ABSTRACT

A turbine for production of electric energy in flowing water, comprising a number of shaped foils (5), each foil (5) being attached with a shaft (6) to a supporting structure (3) which is connected to the main shaft (2) of the turbine, and the shaft (6) of each foil (5) being mainly parallel with the main shaft (2). Each foil (5) is equipped with a step motor (8) and encoder (16), and the main shaft (2) is equipped with an encoder (18) and circuit breaker (19); an external measuring device (22) for measuring the speed of the water (11); and a computer (23) comprising a particular computer programme, to obtain that the signals from said encoders (16,18) and said measuring device (22) being processed in said computer (23), to achieve by assistance of said step motors (8) that the angle of a main surface of each foil (5) be individually regulated into a desired direction of attack relative to the direction of said flowing water (11).

10 Claims, 4 Drawing Sheets

TURBINE DRIVEN WITH A FLUID MEDIUM

CROSS REFERENCE TO RELATED APPLICATIONS

This application is a continuation-in-part of U.S. application Ser. No. 09/869,888, filed 6 Jul. 2001 now abandoned, which is a national stage application under 35 U.S.C. §371 of PCT/NO00/00002, filed 6 Jul. 2000, which claims the benefit of priority application NO-19990039, filed 6 Jan. 1999, and NO-19994310, filed 3 Sep. 1999.

TECHNICAL BACKGROUND

This invention relates to a turbine with adjustable foils driven by slow flowing water, and a method for the production of electric energy by the use thereof.

BACKGROUND OF THE INVENTION

For a long time it has been used different types of equipment to utilize the power in flowing mediums to produce electric energy. To this end, in the recent decades wind turbines with a horizontal rotating shaft have been deployed in vast numbers. It has also been developed wind turbines with a vertical shaft. Such turbines are less noisy due to a lower peripheral speed, and in general the installation and operating costs are lower. To obtain an acceptable efficiency, it will be necessary to adjust the positions of the wings depending upon the direction and speed of the wind.

DE 195 44 400 discloses a device for adjusting the wings of a wind turbine having a vertical axis rotor. The purpose is to control the wings under specified wind conditions to enable the turbine to be started at slow wind speeds and stop the turbine when the wind speed is high. The controlling unit will place the off-wind wings in a perpendicular position to the wind direction and place the in-wind wings aligned with the wind direction. In this way a rotating movement of the turbine at low wind speeds is achieved.

U.S. Pat. No. 4,546,264 (Pinson) discloses an energy generating and storage device driven by the wind, comprising a revolving housing and a plurality of foils mounted in an upright direction from the top surface of the housing. The foils can be adjusted by the use of a wind direction sensor, a computer and a motor controller to be feathered into the wind and moved perpendicular to the wind when rotating with the direction of the wind.

U.S. Pat. No. 4,052,134 (Rumsey) discloses a wind turbine having a vertical rotating shaft which is provided with wings having a device to adjust the foils to a stabile position in line with the turbines rotating track.

NO 302,590 (Jakobsen) discloses a wind turbine having a vertical shaft and a device to counteract the tendency of the foils to align themselves with the apparent direction of the wind.

U.S. Pat. No. 4,168,439 (Palma) discloses a huge wind turbine, with a complicated system of electric motors, gears and instrumentation, for controlling very large wings, primarily seeking to start and stop the contraption.

DK 164.294 discloses a method of modifying wind turbine wings by attaching flexible torpedo shaped bodies at the wings free end.

U.S. Pat. No. 2,950,765 (Magnuson) and U.S. Pat. No. 2,250,772 (Mueller, et al.) disclose turbines having a vertical shaft and controlled foils. The foils are all guided simultaneously by rods that push or pull the foils to a set position, guided by the dislocation of an eccentric mounted turning wheel. The purpose of these turbines is to achieve propulsion of ships.

Turbines for converting flowing water into electric power belong to the prior art. A common feature of most turbines is that the water flow fed to the power generating turbine must be controlled to be within certain limits as to speed, direction and amount. The generated electric energy will be directly proportional with the speed of the flowing water. Thus, to obtain an acceptable efficiency the speed of the water must be high.

Even if the prior art has suggested a number of ways of exploiting the potential energy of slow flowing water streams, there is still not available commercially feasible solutions to the problem. This invention provides a simple and inexpensive turbine for converting the power of slow moving water into electric energy.

SUMMARY OF THE INVENTION

The invention thus provides a turbine driven by flowing water to generate electricity, comprising number of shaped foils of a suitable length, width and thickness, each foil being attached with the upper part of its shaft to a rotating, discoid, supporting structure which is connected to the main shaft of the turbine, and the longitudinal shaft of each said foil being mainly parallel with the main shaft, wherein each foil is equipped with a separate step motor and encoder; and the main shaft is equipped with an encoder and circuit breaker; an external measuring device for measuring the speed of the water; and a computer comprising a particular computer programme, to obtain that the signals from said encoders and said measuring device being processed in said computer, to achieve by assistance of said step motors that the angle of a main surface of each foil be individually regulated into a desired direction of attack relative to the flowing direction of said flowing water.

The turbine is suitable for the production of electric energy from flowing water of a relatively low speed. This is obtained by a method of continuous production of electric energy from flowing water, wherein said production of electric energy is achieved by the use of a turbine comprising number of shaped foils of a suitable length, width and thickness, each foil being attached with the upper part of its shaft to a rotating, discoid, supporting structure which is connected to the main shaft of the turbine, and the longitudinal shaft of each said foil being mainly parallel with the main shaft, each foil is equipped with a separate step motor and encoder; and the main shaft is equipped with an encoder and circuit breaker; by the use of an external device the speed of the water is measured, the signals obtained from said encoders and said measuring device are sent to a computer wherein the signals are processed by the use of a particular computer programme and the output signals are sent to each of said step motors which will pivot its connected foil around its longitudinal shaft, independently of all the other foils, so that the main surface of said foil will be in a desired angle of attack relative to the direction of the flowing water, thus obtaining a maximum exerted force onto each said foil, which will bring the main shaft of the turbine to rotate and the generator to generate electric energy.

DESCRIPTION OF THE INVENTION

The purpose of the invention is to provide a turbine that allows an optimum utilisation of the dynamic forces in a water medium that moves with low speed.

The term "flowing medium" refers to all types of water streams, such as naturally moving water in creeks and rivers, water conveyed to the turbine through a pipe, in ducts and similar vessels, and waves of all kinds found in lakes and oceans.

The term "foil" refers to any wing shaped profile with two congruent, curved, elongated outer surface areas that are connected along a connecting axis, in the direction of speed is blunt and in the aft part are diminishing into a sharp edge. Thus, the foils will have a hydrodynamic shape. A number of foils of different shapes are presented in details in the standards from National Advisory Committee on Aeronautics (NACA), which are well known by the skilled person.

The term "incremental encoder" refers in this invention to a device that counts the revolutions of a shaft. An absolute encoder detects the circumferential position of a shaft.

The term "computer" refers to any electronic computer used to process signals in industrial process control systems.

A number of foil shapes can be used in this invention. A particularly preferred foil is the foil NACA 63.015.

The turbine of the present invention will in general be equipped with 2 to 10 foils, preferably between 4 and 8 foils, more preferred 5 foils. Each foil is connected to the underside of a rotating discoid structure in such a way that the foil will be in a mainly vertical position and parallel to the rotating shaft of the discoid structure. Each foil has an eccentric positioned shaft that is fixed to the supporting structure. The foils are spaced in mainly equal distances from each other and at mainly equal distances from the centre of the rotating structure.

The size of the foils is not particularly restricted as long as they can fulfil the purpose. The size will depend on the speed of the flowing water. In general, the foils may be of a vertical length from 1 m to 100 m. Preferably the length is between 5 m and 20 m, more preferably about 10 m. The width of the foils, or horizontal cut, is typically from 0.5 to 5 m, preferably from 0.5 to 2 m, more preferably about 1 m. The maximum thickness of the foil is typically between 0.05 and 1 m, but this will depend on the chosen type of foil.

The foils can be made of any suitable material, preferably chosen from the group comprising steel, aluminium and polymer composites such as glasfibre reinforced unsaturated polyester-resin (GUP). The dimensional criteria are given by the selection of the material.

Figure 1:
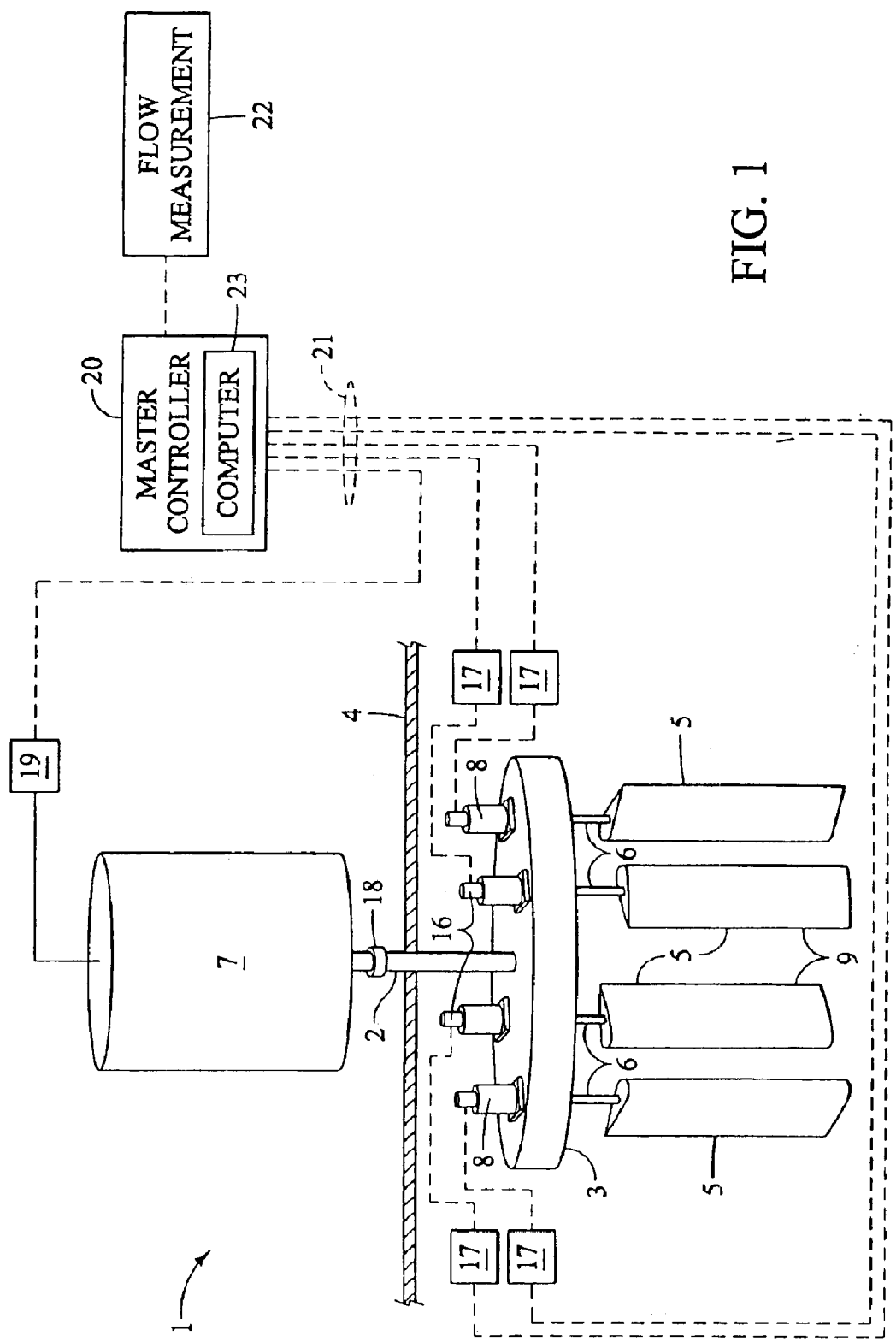
FIG. 1 is a schematic perspective drawing showing a four foiled, vertical shaft turbine, according to the invention.

With reference to the figures, FIG. 1 illustrates a turbine 1 having a vertical rotating shaft 2, to which to a discoid supporting structure 3 is connected. To the lower side of the supporting structure, a number of foils 5 are attached. The longitudinal shaft 6 of each foil permits pivoting of the foil. The upper end of the shaft is connected to the supporting structure 3. Each foil 5 is connected with a rotating motor 8 which can pivot the foil around its longitudinal shaft 6. The shaft is aligned with the turbine shaft 2, in such a way that the foil can be turned into any position relative to the flowing water.

The yield of the foil 5 will be influenced by the turbulence created around the free ends 9 of the foils 5. To reduce the loss of energy caused by the turbulence, there is attached to the free end 9 of each foil 5 a suitably formed object that will reduce the drag promoted by a normal abrupt termination of the foil. This object may be a flat shaped object 15; or torpedo shaped object 10 being of a size from 1 to 50 times, more preferred 2 times, the section area of the foil 5; or carefully shaped elliptical body 14 of a shape defined as one ½ of the foil profile with the blunt end corresponding to the blunt part of the free end 9 of the foil 5, and tapers to the sides of that shape to give it a smooth fit to the sides of free end 9 of the foil 5, and which size is in the range of 1 to 50 times the width of the foil 5, more preferably to be of the same size as the foil 5.

The supporting structure consists of a discoid object 3, and the foils 5 are positioned near the periphery thereof. Thus, during operation the foils 5 will have a circular track 12 concentric with the turbine shaft 2. This circular track 12 is defining the outer diameter of the turbine. In the turbine main structure 4 a device transforms the rotating motion of the shaft to a dynamo 7, enabling production of electric energy.

Figure 2:
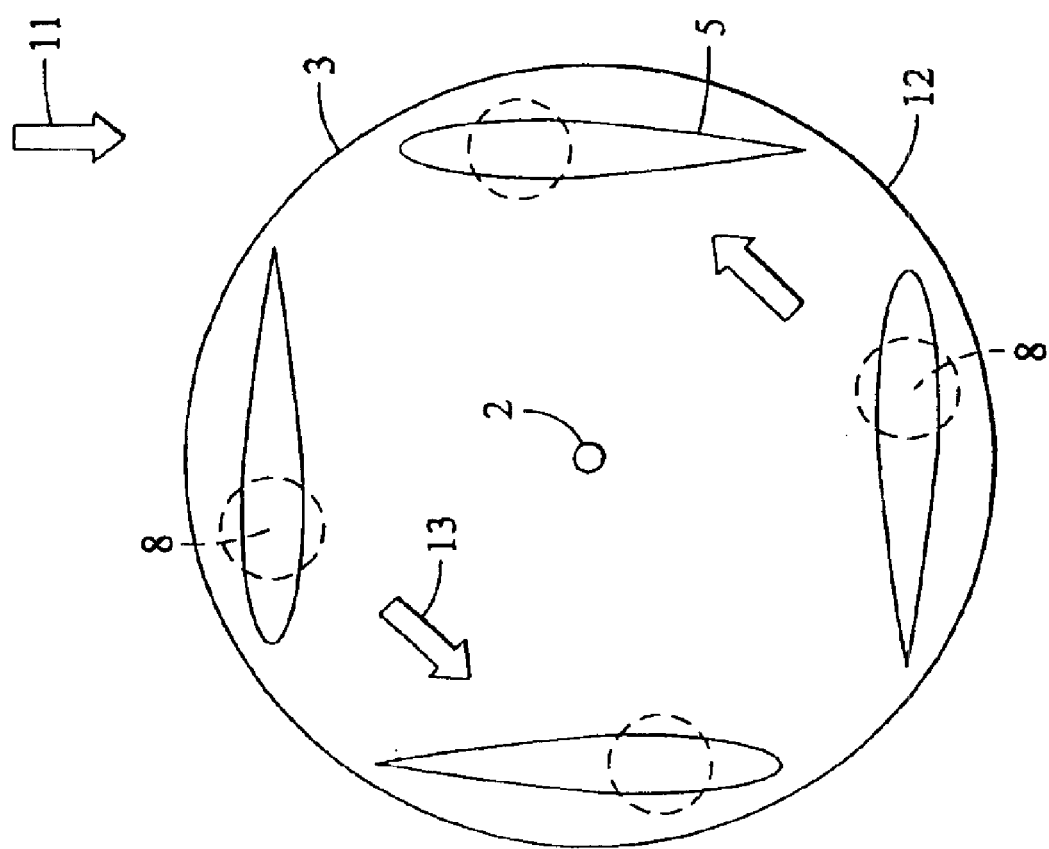
FIG. 2 is a horizontal section view showing a discoid supporting structure with four foils attached.

FIG. 2 is a drawing showing the turbine with a turbine shaft 2 and a number of foils 5 attached to the supporting structure 3, consisting of a discoid plate, to which the foils 5 are pivotable connected near the periphery of the plate. Thus, the foils 5 will follow a track 12 concentric with the turbine shaft 2. It is indicated how a motor 8 is placed over the foils 5. A number of arrows indicate the direction of the flow 11 and the rotation of the turbine 13.

Figure 3:
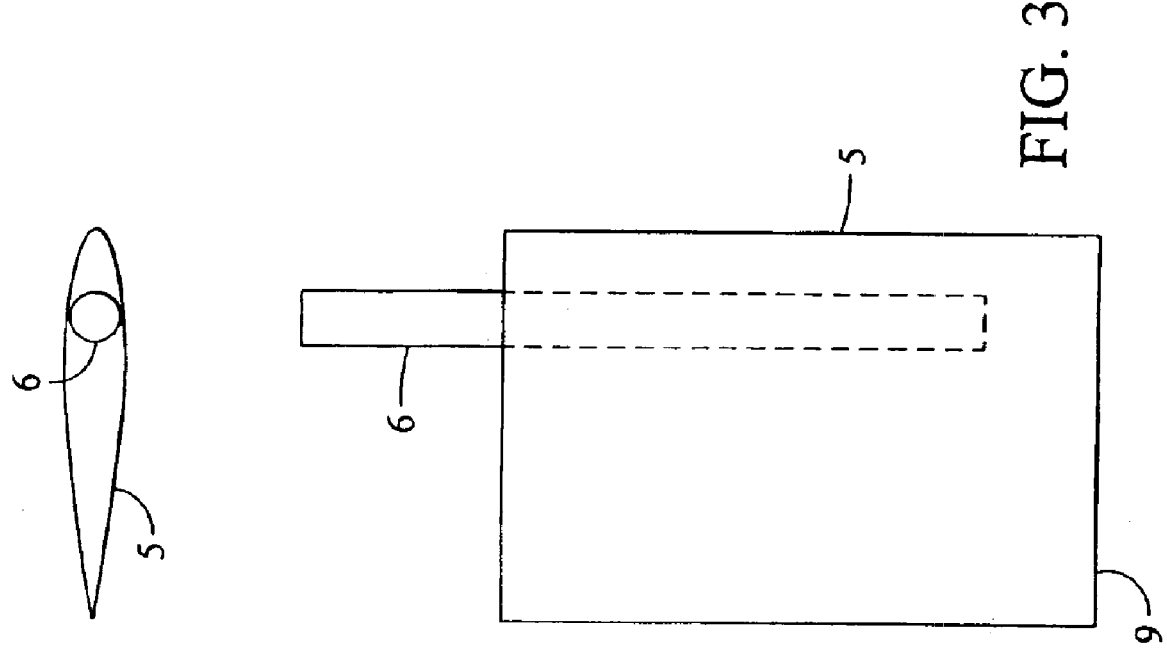
FIG. 3 is a vertical section view through a foil.
Figure 3:
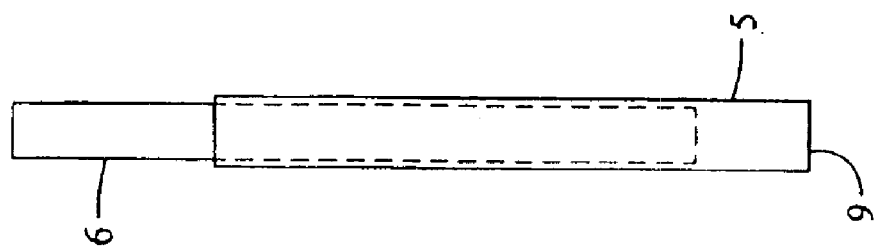

FIG. 3 is a drawing through the foil 5 in the centreline of the foil width. It is indicated how the longitudinal shaft 6 is incorporated into the foil 5, the shape of the foil 5 including the free end 9 of the foil 5.

FIG. 4 is a drawing of the foil 5 and of alternative shapes of the free end 9 of the foil 5.

Figure 4C:
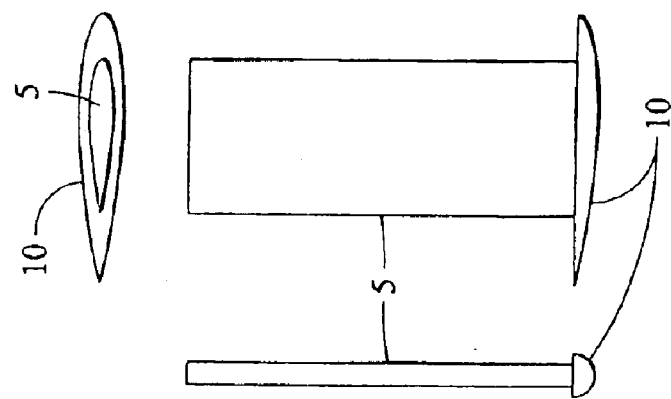
FIG. 4 is a drawing showing suggested hydrodynamic bodies at the free end of the foil.
Figure 4B:
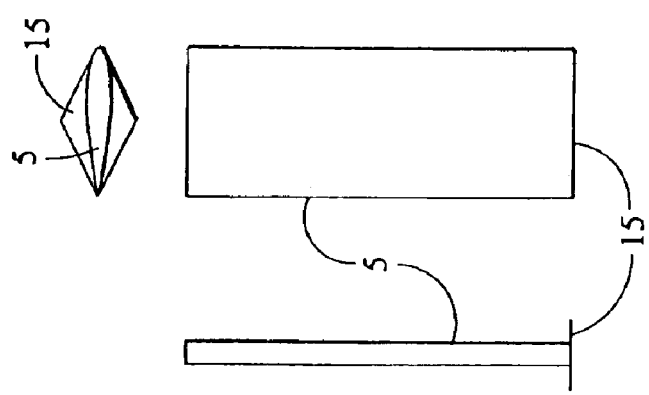
Figure 4A:
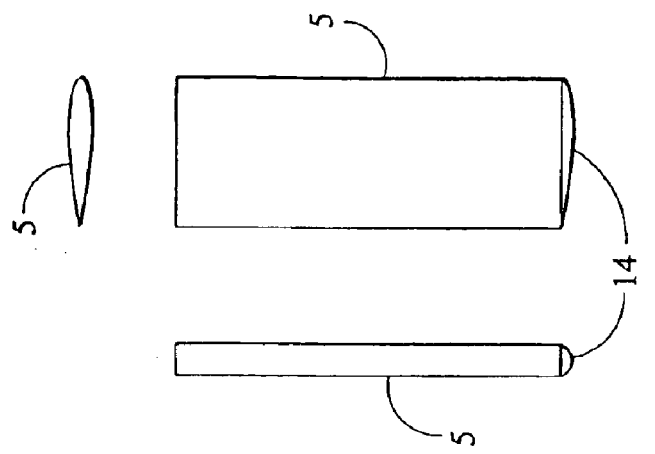

FIG. 4a. is a drawing of the foil 5 and a carefully shaped elliptical body 14, which shape is defined as ½ of the foil profile.

FIG. 4b. is a drawing of the foil 5 and of a flat-shaped object 15. The object is of a parallelogram shape 15 with the diagonal as the foil 5 centre. The parallelogram will exceed the foils 5 dimensions equally on both sides of the foil 5. The thickness of the parallelogram 15 is not critical and therefore not indicated.

FIG. 4c. is a drawing of the foil 5 and of a torpedo shaped object 10, which will exceed the foil 5 dimensions on all sides. Torpedo shaped object 10 has previously not been applied on vertically erected foil 5.

This invention utilises the same type of motor 8 for each of the foils 5. The motor may be a step motor, preferably a step motor of the type hybrid step, plate step or ordinary step motor.

All foils 5 are provided with the same controlling system. This system allows a complete control of the position of each foil 5. Thus, by the use of the motor 8, it will be possible to rotate the foil 5 such that the main surface of the foil will be in a desired angle to the water flow direction. Since the foils 5 also are moving in a circular track, the individual position of each foil must continuously adjusted in a dynamic way.

With reference to FIG. 2, the cycle of rotation of the turbine will now be described. The foils 5 in a basically vertical position in streaming water will, due to the pivotable attachment, tend to align themselves in a position giving least resistance, i.e. in line with the flowing medium. To obtain a rotation of the turbine and hence a production of electricity, each foil 5, attached to its respective motor 8 on the discoid supporting structure 3, will be turned into a desired suitable angle to the flow, preferable in an angle within the range of 5° and 50°. The flowing water will therefore exert a force onto the surface of the foils 5 and bring the turbine into motion. As the turbine rotates, the angle of each foil 5 to the water flow will change. The motor 8 will be governed to turn the foils 5 into a desired angle of attack as indicated above. The accuracy of this adjustment of the angle of attack to the flow will depend upon the ability of the motor to find and keep the ordered position. Adequate adjustments will be made during the circular track of the foil 5. Therefore, the foil 5 will generate a force during most of the total cycle giving an optimum production of power.

It is preferable that the blunt end of the foil 5 is the leading edge through the flow. In reference to FIG. 2, and as indicated by arrows showing the turning 16 and flowing 11 motions, the blunt edge of the foil 5 will be the leading edge. The position of the foils will be the same irrespectively of the nature of the fluid medium.

Since the pivotable position of the foils 5 is individually adjustable by the motors 8 the turbine can be started and stopped regardless the speed of the flowing medium without causing a breakdown of the contraption.

The pivotable motion of the foils 5 with its governing system enables a position of the foils 5 that will keep the turbine still, enabling repair and maintenance work.

The foils 5 will bring the discoid supporting structure 13 to rotate with limited speed, preferably between 5 and 60 Rpm, more preferred 5 to 20. The rotating speed can be controlled by the foil's 5 position in the flow.

The amount of force generated by the turbine is dependent of the height, width and length of the foils 5 together with the flow rate. Low speed foils 5 are more convex and have a larger surface area than high speed ones. The surface should be prepared to encourage laminar flow of the medium.

Maximum yield from the turbine will best be achieved by utilising an electronic control program to pivot the foils into the most favourably position, taking into account the best combination of speed and force.

The main shaft of the turbine 2 should be in a mainly perpendicular position to the surface of the flowing water. However, a minor deviation from this position will not influence the yield from the turbine 2.

To obtain maximum power from the streaming water the action of the motors must be governed precisely. It is imperative to have a correct control of the angles of attack. This can be achieved only when one knows the exact positions of the foils relative to the water flow direction and the foil-carrying member, as well as the position on the peripheral circumference. In advance, it is decided which position the foils should have. This predefined position will depend upon a computation of foil speed, water speed and circumferential speed. These actual positions must be measured and computed, then compared to the predefined desired positions, and then the step motors are instructed to undertake the necessary movements of the foils. Since all computer calculations and motor movements take some time, the measured and predefined positions will not be exactly equivalent. The two positions must be measured, computed and compared to the predefined desired positions continuously. The step motors must therefore continuously be instructed to undertake all necessary movements. The turbine of the present invention is provided with an instrumentation consisting of a number of carefully placed registration devices combined with intelligent electronic computing and regulating hardware and stepping motors, enabling us to continuously control and rotate each foil individually to optimise the output of power from the present streaming water.

On the shaft 6 of each foil 5 there is mounted an absolute encoder 16, which gives a position signal to a controller box 17. Thus, each foil is provided with its own step motor 8, encoder 16 and controller box 17. On the main shaft 1 there is mounted an incremental encoder 18 and a circuit breaker 19. The information from the incremental encoder 18 and the circuit breaker 19 is conveyed to a master controller box 20. All controller boxes communicate via a bus system 21.

The speed of the water is measured by the use of an external measuring device 22 and the information sent to the master control box 20.

This master control box 20 is also receiving the computing and directional signals via a slip brush contact 22 from a computer 23. A software program enables the computer 23 to govern the movement of the motors 8 and these are loaded into the master controller box 20 and the controller boxes 17.

When the turbine shall be started a unique start-up procedure is followed:

The controlling system will compute the different positions of the main shaft 1 and shafts 6 of the foils 5 by the use of the corresponding encoders 16 and 18, and circuit breaker 19. This will enable the step motors 8 to position the foils 5 into the most favourable position, which is the one where the flowing water will exert an optimal force on the foils and hence lead to a movement. The system will adjust the foils 5 continuously during a starting period to achieve the desired revolutions per min. During normal operation, this unique governing system will then adjust angle of attack of each foil 5 with the help of the step motors 8 to a position where the maximum force are exerted from the flowing water. The system will simultaneously adjust the speed of the system so that the desired number of revolutions per minute will be as desired.

When the turbine is running and producing electric power, the controlling system will compute the actual positions of the shafts 1 and 6 by the use of the corresponding encoders 16 and 18, circuit breaker 19, and the water speed measuring device 22. The governing system of the invention will then adjust the angle of attack of each foil 5 continuously by the use of the step motors 8 to positions where the maximum force are exerted from the flowing water. The controlling system will simultaneously adjust the speed so that the revolutions per minute will be at a desired and acceptable number.

When the turbine shall be stopped, e.g. due to maintenance, the unique controlling system will compute the different positions of the main shafts 1 and shafts 6 of each foil 5 by the use of the corresponding encoders 16 and 18, circuit breaker 19, and the water speed measuring device 22. This will enable the unique governing system to adjust the angle of attack of each foil 5 by the use of the step motors 8 to position the foils 5 gradually into positions such that the forces on the foils are reduced to a minimum and enabling the turbine to stop.

The EDP program enabling complete control of all functions as described above has been developed and tested by the inventors in a pilot plant. The result showed that such a control program is essential to obtain purpose of the invention.

A turbine, according to the invention, is suitable for installation on floating or submersed units anchored to the riverbed, seabed or shores. Suitable floating elements are pontoons, floats, rafts, boats, barges, rigs, "semi-submersibles", "tension legs platforms" or purpose built constructions. The turbine can also be mounted to fixed construction, such as jackets, GBS, sub sea structures, executed in, concrete, GUP, steel or other metal. These fixed structures may also be purpose build.

The construction of the turbine enables small or large units. The turbine can be installed as a single standing unit or in a multiple construction, in a pattern encouraging optimum utilisation of the available flow. The installations can be built and deployed without major impact on the environment. The turbine can be installed in the ocean, below the surface of the sea, and hence give no visual impression or hamper sea transportation. Likewise the said flowing water is selected from the group comprising a river, a creek, and a channel conveying relatively slow flowing water, tidal currents and sea currents.

What is claimed is:

1. Turbine driven by flowing water to generate electricity, comprising number of shaped foils (5) of a suitable length, width and thickness, each foil (5) being attached with the upper part of its shaft (6) to a rotating, discoid, supporting structure (3) which is connected to the main shaft (2) of the turbine, and the longitudinal shaft (6) of each said foil (5) being mainly parallel with the main shaft (2), wherein each foil (5) is equipped with a separate step motor (8) and a respective first encoder (16); and the main shaft (2) is equipped with a second encoder (18) and circuit breaker (19); an external measuring device (22) for measuring the speed of the water (11); and a computer (23) comprising a particular computer programme, to obtain that the signals from said encoders (16,18) and said measuring device (22) being processed in said computer (23), to achieve by assistance of said step motors (8) that the angle of a main surface of each foil (5) be individually regulated into a desired direction of attack relative to the flowing direction of said flowing water(11).

2. Turbine according to claim 1, wherein said step motor (8) is selected from the group comprising a hybrid step motor, a plate step motor and an ordinary step motor.

3. Turbine according to claim 1, wherein the free end (9) of each foil is equipped with a flat parallelogram-shaped object (15) being in a perpendicular position to the longitudinal axis of said foil (5).

4. Turbine according to claim 1, wherein the free end (9) of each foil is equipped with a torpedo-shaped object (10) in a perpendicular position to the longitudinal axis of said foil (5).

5. Turbine according to claim 1, wherein the free end (9) of each foil is equipped with an elliptic body (14) in a perpendicular position to the longitudinal axis of said foil (5).

6. Turbine according to claim 1, wherein said foils (5) and said step motors (8) are connected to a discoid supporting structure (3).

7. Turbine according to claim 1, wherein the rotating shaft (2) is in a mainly vertical position.

8. A method of continuous production of electric energy from flowing water, wherein said production of electric energy is achieved by the use of a turbine comprising number of shaped foils (5) of a suitable length, width and thickness, each foil (5) being attached with the upper part of its shaft (6) to a rotating, discoid, supporting structure (3) which is connected to the main shaft (2) of the turbine, and the longitudinal shaft (6) of each said foil (5) being mainly parallel with the main shaft (2), each foil (5) is equipped with a separate step motor (8) and respective first encoder (16); and the main shaft (2) is equipped with a second encoder (18) and circuit breaker (19); by the use of an external device (22) the speed of the water (11) is measured, the signals obtained from said encoders (16,18) and said measuring device (22) are sent to a computer (23) wherein the signals are processed by the use of a particular computer programme and the output signals are sent to each of said step motors (8) which will pivot its connected foil (5) around its longitudinal shaft (6), independently of all the other foils (5), so that the main surface of said foil (5) will be in a desired angle of attack relative to the direction of the flowing water (11), thus obtaining a maximum exerted force onto each said foil (5), which will bring the main shaft (2) of the turbine to rotate and the generator to generate electric energy.

9. The method of claim 8, wherein said turbine is located with its main shaft (2) in a mainly vertical position in said flowing water.

10. The method of claim 9, wherein said flowing water is selected from the group comprising a river, a creek, and a channel conveying relatively slow flowing water, tidal currents and sea currents.

* * * * *